US012606117B2

(12) United States Patent
Gwon et al.

(10) Patent No.: US 12,606,117 B2
(45) Date of Patent: Apr. 21, 2026

(54) SIDE AIRBAG DEVICE FOR VEHICLE

(71) Applicant: AUTOLIV DEVELOPMENT AB, Vargarda (SE)

(72) Inventors: Tae Ik Gwon, Gyeonggi-do (KR); Yong Hyun Jung, Gyeonggi-do (KR); Jong Ki Byun, Gyeonggi-do (KR); Dae Chang Jung, Gyeonggi-do (KR)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 18/855,931

(22) PCT Filed: Apr. 15, 2022

(86) PCT No.: PCT/KR2022/005472
§ 371 (c)(1),
(2) Date: Apr. 24, 2025

(87) PCT Pub. No.: WO2023/200032
PCT Pub. Date: Oct. 19, 2023

(65) Prior Publication Data
US 2025/0249859 A1 Aug. 7, 2025

(51) Int. Cl.
B60R 21/231 (2011.01)

(52) U.S. Cl.
CPC .................. B60R 21/23138 (2013.01); B60R 2021/23146 (2013.01)

(58) Field of Classification Search
CPC .............. B60R 21/23138; B60R 2021/23146
See application file for complete search history.

(56) References Cited

U.S. PATENT DOCUMENTS 5,803,485 A * 9/1998 Acker .............. B60R 21/23138
280/730.2
6,062,594 A * 5/2000 Asano .............. B60R 21/23138
280/730.2
(Continued)

FOREIGN PATENT DOCUMENTS

DE 19646698 A1 * 5/1997 ....... B60R 21/23138
JP 2017144996 A 8/2017
(Continued)

OTHER PUBLICATIONS

KR-19980022289-U (machine translation) (Year: 1998).*
DE-19646698-A1 (machine translation) (Year: 1997).*

*Primary Examiner* — Jason D Shanske
*Assistant Examiner* — Joselynn Y Sliteris
(74) *Attorney, Agent, or Firm* — Harness, Dickey & Pierce, P.L.C.; Ryan W. Massey

(57) ABSTRACT

A side airbag device for a vehicle, comprising: an airbag cushion that is built into a backrest of a seat and inflated and deployed so as to correspond to the entire side surface of an occupant's upper body in the event of a side impact crash of the vehicle; and an inflator that generates gas according to an impact detection signal in the event of the side impact crash of the vehicle to supply the gas to the airbag cushion, wherein the airbag cushion is configured such that the height of upward inflation and deployment is expanded by contact with the occupant's arm, thereby avoiding interference with a curtain airbag at the initial stage of deployment of the airbag cushion and safely protecting the head of the occupant by expanding an upper chamber thereof upward by contact with the occupant's arm.

6 Claims, 6 Drawing Sheets

(56)         References Cited

U.S. PATENT DOCUMENTS 6,065,772 A  *  5/2000  Yamamoto ............ B60R 21/207
                                                              280/730.2
6,155,598 A     12/2000  Kutchey
6,206,411 B1 *   3/2001  Sunabashiri ...... B60R 21/23138
                                                              280/730.2
7,431,332 B2 *  10/2008  Wipasuramonton .........................
                                                      B60R 21/23138
                                                              280/730.2
7,581,752 B2 *   9/2009  Kai ................... B60R 21/23138
                                                              280/730.2
7,891,704 B2 *   2/2011  Taguchi ............ B60R 21/23138
                                                                280/739
7,954,846 B2 *   6/2011  Iwayama ............... B60R 21/18
                                                              280/730.2
8,322,747 B2 *  12/2012  Shankar ............ B60R 21/23138
                                                              280/730.2
8,840,135 B2 *   9/2014  Jenny ...................... B60R 21/20
                                                              280/730.2
9,707,922 B2 *   7/2017  Wiik ................. B60R 21/23138

9,873,400 B2 *   1/2018  Scherr ................... B60R 21/233
11,851,020 B1 *  12/2023  Deng ............... B60R 21/23138
12,115,926 B2 *  10/2024  Morozini De Lira .......................
                                                      B60R 21/23138
2004/0183285 A1*  9/2004  Nishikaji .......... B60R 21/23138
                                                              280/730.2
2012/0038135 A1*  2/2012  Oomori ................. B60R 21/237
                                                              280/730.2

FOREIGN PATENT DOCUMENTS

JP        2018-176906 A     11/2018
KR      10-1998-0024967 A     7/1998
KR         19980022289 U  *   7/1998  ....... B60R 21/23138
KR        10-1708213 B1      2/2017
KR         101739857 B1      5/2017
KR        10-1866083 B1      6/2018
KR      10-2020-0003413 A     1/2020
KR      10-2021-0002883 A     1/2021
KR      10-2021-0119161 A    10/2021
KR      10-2022-0139183 A    10/2022

* cited by examiner

SIDE AIRBAG DEVICE FOR VEHICLE

TECHNICAL FIELD

The present invention relates to a side airbag device of a vehicle, and more particularly, to a side airbag device of a vehicle which protects an occupant by preventing collision between occupants upon side collision of the vehicle.

BACKGROUND ART

In general, a vehicular airbag device is a safety device that protects a passenger by injecting gas into an airbag according to a signal of an impact detection sensor upon vehicle collision, and rapidly inflating the airbag.

Such an airbag device is installed in a steering wheel, a dashboard, a seat, a sidewall, etc. provided in a vehicle, and protects an occupant by being inflated toward a front side or a side of the occupant upon vehicle collision.

That is, a vehicle may be provided with a frontal airbag which is deployed in front of a driver seat and a passenger seat, a curtain airbag and a side airbag which are deployed from where side collision occurs (hereinafter, referred to as a 'collision side') to protect a passenger, and a knee airbag for protecting passenger's knee.

The side airbag may include a near side airbag which is inflated and deployed between a passenger and a vehicular configuration member like a door, and protects an occupant from the vehicular configuration member protruding inwards from an impact by side collision, and a far-side airbag or a center side airbag which restricts movement of an occupant moving to the inside of a vehicle due to reaction to side collision.

Meanwhile, the side airbag must entirely protect the side of the occupant's body, from the head to the lower body.

However, as the occupant may adjust an angle of a backrest in various ways, the occupant's posture is not constantly fixed in one position.

For example, when the occupant is in the normal seating position, the side airbag must avoid interference with the curtain airbag during deployment, so as not to hinder the deployment of the curtain airbag.

That is, if interference occurs between an upper part of the side airbag and a lower part of the curtain airbag, the thickness and pressure provided on the upper part of the side airbag may exert impact on the occupant's chest, potentially increasing the risk of rib damage.

Additionally, if the occupant rotates the backrest backward to take a rest in a rest mode, deviating from the normal seating position, the side airbag must still sufficiently protect the occupant's head, which is moved backward and upward from the backrest.

Therefore, there is a demand for technology that can protect not only the side of the occupant's body from the head to the lower body in the normal seating position but also in the rest mode.

(Patent Document 1) Korean Patent Registration No. 10-1866083 (published on Jun. 11, 2018)
(Patent Document 2) Korean Patent Registration No. 10-1708213 (published on Feb. 20, 2017)

DISCLOSURE OF INVENTION

Technical Problem

An object of the present invention is to solve the problems as described above, and is to provide a side airbag device for a vehicle which may safely protect an occupant by inflating and deploying an airbag toward a side of the occupant in the event of side collision of the vehicle.

Another object of the present invention is to provide a side airbag device for a vehicle which may safely protect the occupant's head by moving the occupant's arm upward upon side collision, thereby expanding an upper chamber of the side airbag upward.

Further another object of the present invention is to provide a side airbag device for a vehicle which may safely protect the occupant's lower and upper body, including the pelvis area to the head, regardless of the occupant's posture.

Solution to Problem

To achieve the above-described objects, a side airbag device of a vehicle according to the present invention includes an airbag cushion which is embedded in a backrest of a seat and is inflated and deployed to correspond to an entire side surface of an upper body of an occupant upon side collision of the vehicle; and an inflater configured to generate a gas by an impact detection signal upon the side collision of the vehicle to supply the gas to the airbag cushion, wherein the airbag cushion has a height to which the airbag cushion is inflated and deployed upward due to contact with an occupant's arm.

Advantageous Effects of Invention

As described above, in the side airbag device of the vehicle according to the present invention, the effect of being able to adjust the height at which the airbag cushion of the side airbag is inflated and deployed upward may be obtained.

That is, according to the present invention, in the early stage of airbag cushion deployment, the height to which the airbag cushion inflates upward may be limited to avoid interference with the curtain airbag.

Thus, according to the present invention, injury to occupant's chest caused by excessive pressure generated in the side airbag due to the upper portion of the side airbag interfering with the lower portion of the curtain airbag may be prevented.

Also, according to the present invention, the occupant's arm may be in contact with the airbag cushion to move upward to expand upward the upper chamber of the airbag cushion.

Therefore, according to the present invention, the upper chamber may expand to safely protect the occupant's head, even when the occupant is in the reclining posture with the backrest tilted backward by more than 40 degrees.

As a result, according to the present invention, an effect may be achieved in that the occupant's lower and upper body, from the pelvis portion to the head, may be safely protected as a whole, regardless of the occupant's posture.

BEST MODE FOR CARRYING OUT THE INVENTION

Hereinafter, a side airbag device of a vehicle according to a preferred embodiment of present the disclosure will be described in detail with reference to the accompanying drawings.

In the present invention, a side airbag device is embedded in a backrest, and during side collision of the vehicle, an airbag cushion expands and deploys forward, upward, and downward from a side surface of the backrest to correspond to the entire side of an occupant's upper body, thereby safely protecting the occupant.

Hereinafter, a configuration of the side airbag device installed in a driver seat of a normal vehicle will be described, and a direction of facing a front surface of the vehicle with reference to a driver seat will be referred to as a 'forward direction F,' and a direction of facing a rear surface of the vehicle will be referred to as a 'backward direction B'. Along with these terms, terms indicating directions such as 'left side L,' 'right side R,' 'upward direction U,' and 'downward direction D' are defined to indicate respective directions with reference to the forward direction and the backward direction described above.

Accordingly, the forward and backward F and B directions of the vehicle may be expressed as a horizontal direction, and the upward and downward U and D directions of the vehicle may be expressed as a vertical direction.

Also, hereinafter, a configuration of a near-side airbag, being inflated and deployed between the occupant and a vehicle configuration member such as a door, protecting the occupant from vehicle configuration member protruding inward due to the impact of side collision will be described.

Here, the present invention may also be modified to apply to a far side airbag or center side airbag, which restricts the movement of the occupant moving toward the inside of the vehicle due to the rebound from the side collision.

Figure 1:
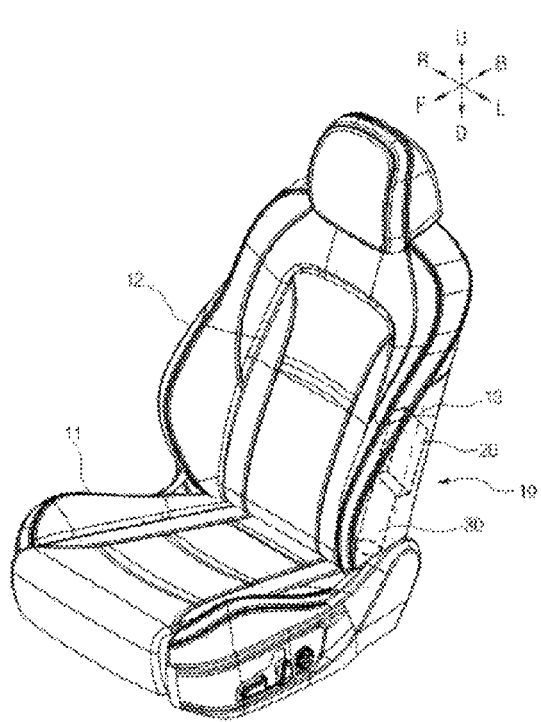
FIG. 1 is a perspective view of a seat to which a side airbag device for a vehicle is applied, according to a preferred embodiment of the present invention.
Figure 2:
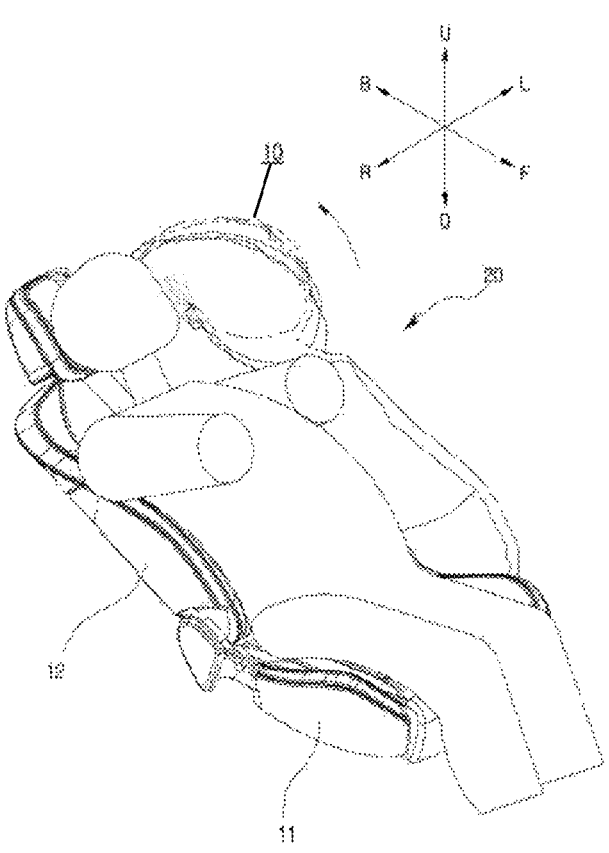
FIG. 2 is a perspective view of a state in which an airbag cushion is deployed in the side airbag device of the vehicle shown in FIG. 1.

FIG. 1 is a perspective view of a seat 10 to which a side airbag device for a vehicle is applied, according to a preferred embodiment of the present invention, and FIG. 2 is a perspective view of a state in which an airbag cushion is deployed in the side airbag device of the vehicle shown in FIG. 1.

A side airbag device of the vehicle according to the preferred embodiment of the present invention, includes an airbag cushion 20 embedded in a backrest 12 of a seat 11 and inflated and deployed to correspond to an entire side surface of an upper body of the occupant upon side collision of the vehicle, and an inflater 30 which generates a gas in response to an impact detection signal upon the side collision of the vehicle to supply the gas to the airbag cushion 20.

The airbag cushion 20 is inflated and deployed from the backrest 12 of the seat 11 in the forward, upward, and downward directions, and is inflated and deployed to correspond to the side of the pelvis and the whole upper body of the occupant, that is, the belly, chest, neck, and head of the occupant. As such, the airbag cushion 20 may be inflated and deployed between the occupant and the vehicle configuration member such as the door, to safely protect the occupant from the vehicle configuration member, which protrude inward due to the impact of side collision.

For this, the airbag cushion 20 may be provided to be inflated and deployed in a substantially circular, oval, or hexahedral shape, and may be inflated and deployed from the side of the occupant toward the upward and forward directions.

Figure 3:
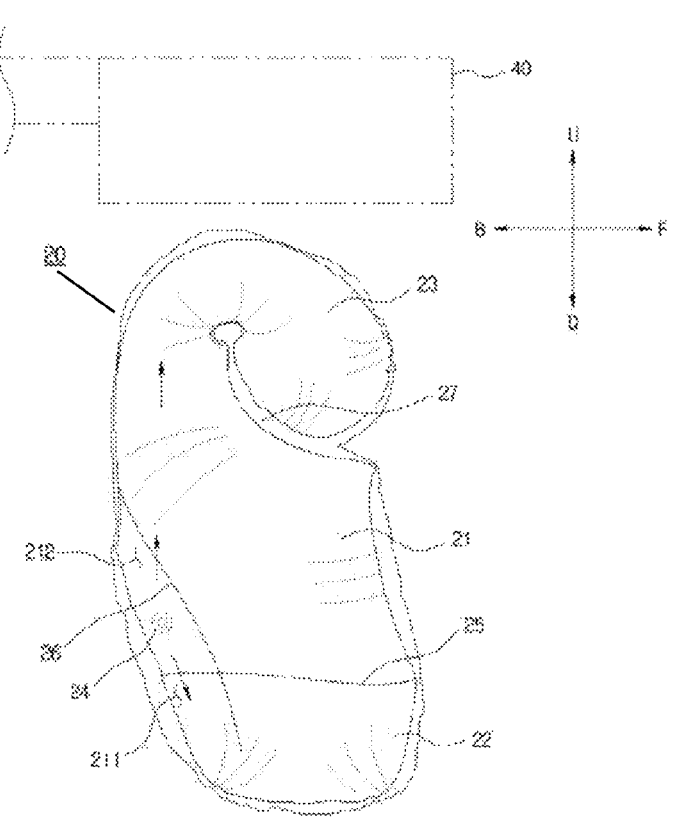
FIGS. 3 and 4 are a side view and a front view of the airbag cushion shown in FIG. 2, respectively.

For example, the airbag cushion 20 may be drawn out from a near side of the occupant, i.e., drawn out to the outside of the backrest 12 by cutting along an incision line 13 defined on a left side surface of the backrest 12, as shown in FIGS. 2 and 3, and may be inflated and deployed forward, upward, and downward toward the side surface of the whole upper body of the occupant.

The airbag cushion 20 may be provided in a bag shape by joining an edge of an inner panel, which is in contact with the occupant during inflation and deployment, with an edge of an outer panel, provided on the opposite side to the inner panel, such through a sewing method or similar techniques.

The airbag cushion 20 may be partitioned into a plurality of chambers.

For example, the airbag cushion 20 may include a central chamber 21 which corresponds to an occupant's chest and upper abdomen, a lower chamber 22 which corresponds to an occupant's pelvis and lower abdomen, and an upper chamber 23 which corresponds to an occupant's head.

Here, the upper chamber 23 may be vertically rotatable with respect to a rear end in which is connected to the central chamber 21.

That is, when the occupant is in a rest mode position, for example, when the occupant is reclined in a backward-leaning position in a state in which the backrest is tilted backward, the upper chamber 21 may rotate upward to correspond to a state in which the occupant's head protrudes toward a rear-upper side of the backrest.

As such, the present invention may be configured to reduce a height of a portion protruding upward in the airbag cushion, compared to that of a portion protruding upward of the cushion applied to the side airbag in the prior art, in order to avoid interference with a curtain airbag during a deployment process of the side airbag.

Additionally, according to the present invention, the occupant's shoulder and arm may move upward upon contact with the side airbag when the door or other parts intrude into the vehicle due to the side collision.

As a result, according to the present invention, the upper chamber may expand upward to correspond to the occupant's head, which is in the rest mode position, by moving the occupant's arm upward.

Accordingly, according to the present invention, the upper chamber may expand to safely protect the occupant's head, even when the occupant is in a reclining posture with the backrest tilted backward by more than 40 degrees.

Hereinafter, a configuration of the airbag cushion will be described in detail with reference to FIGS. 1 to 6.

Figure 4:
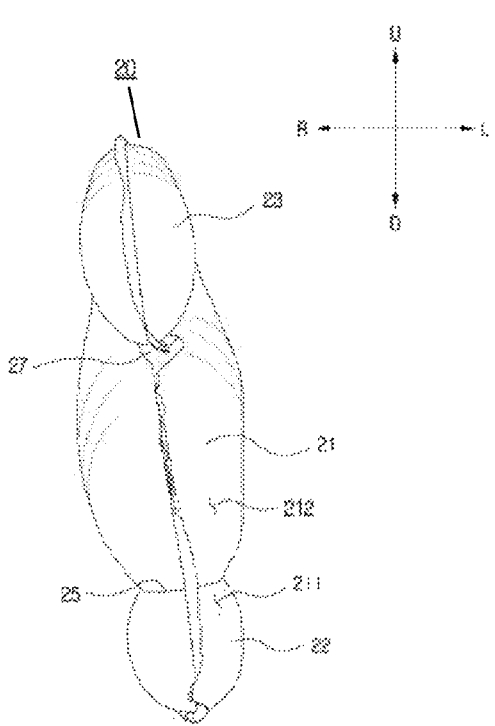
Figure 5:
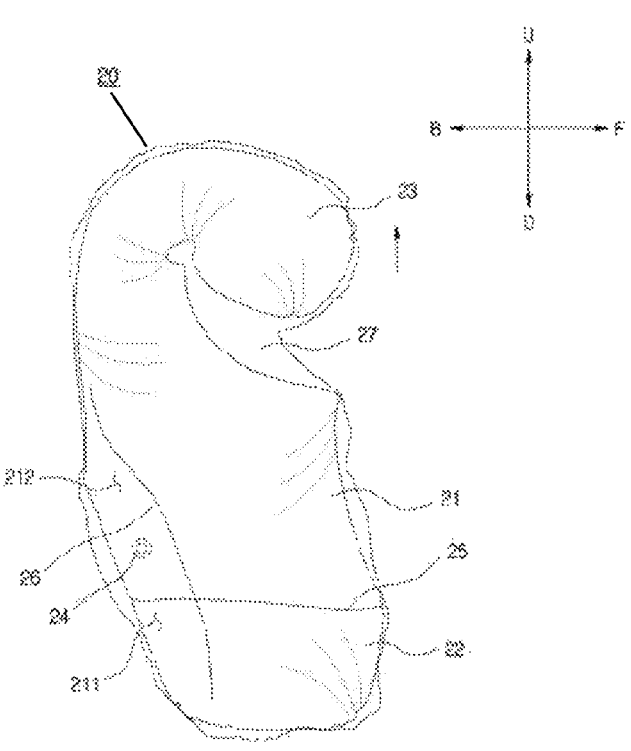
FIGS. 5 and 6 are a side view and a front view illustrating a state in which an upper chamber of the airbag cushion is rotated upward, respectively.
Figure 6:
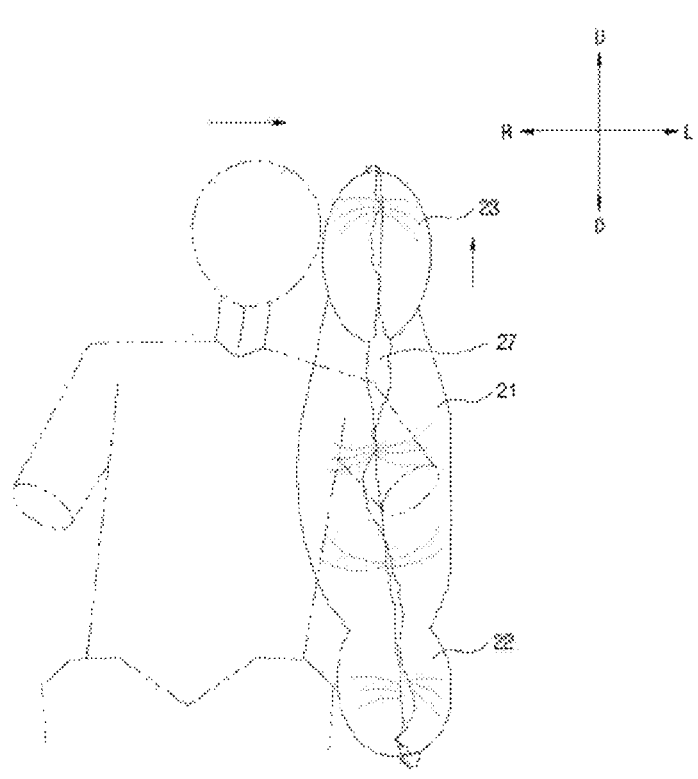

FIGS. 3 and 4 are a side view and a front view of the airbag cushion shown in FIG. 2, respectively, and FIGS. 5 and 6 are a side view and a front view illustrating a state in which the upper chamber of the airbag cushion is rotated upward, respectively.

That is, FIGS. 3 and 4 show a deployment operation state of the airbag cushion at an initial stage of the collision, and FIGS. 5 and 6 show a deployment operation state of an airbag cushion at a point after a certain amount of time is elapsed following the collision.

As shown in FIGS. 3 to 6, a supply hole 24 may be defined in a central portion of the airbag cushion 20, i.e., in the central chamber 21, which is connected to the inflater 30 to receive the gas upon the side collision of the vehicle.

The airbag cushion 20 may have a plurality of chamber walls.

For example, a first chamber wall 25 may be provided between the central chamber 21 and the lower chamber 22, separating the central chamber 21 from the lower chamber 22.

A second chamber wall 26 may be provided in the central chamber 21, defining a shape of the central chamber 21.

A third chamber wall 27 may be provided between the central chamber 21 and the upper chamber 23, which partitions the central chamber 21 from the upper chamber 23.

The first chamber wall 25 may be provided approximately horizontal along the front-rear direction of the airbag cushion 20, or slightly inclined toward the front-lower side of the airbag cushion 20.

A lower vent 211, which supplies the gas provided to the central chamber 21 to the lower chamber 22, may be defined between the first chamber wall 25 and a rear end of the airbag cushion 20. The central chamber 21 includes a vent 212.

The second chamber wall 26 may be provided in the vertical direction between a rear end of the central chamber 21 and a central portion of the central chamber 21. The second chamber wall 26 may extend from an approximately central rear end of of the inner panel of the airbag cushion 20 to a lower end of the lower chamber 22.

Thus, the central chamber 21 and the lower chamber 22 may be inflated and deployed so that each of the central and front ends has a thickness greater than that of the rear end with respect to the second chamber wall 26.

For example, the central chamber 21 may be inflated and deployed such that a width in a left-right direction gradually decreases upward from the central portion thereof.

Thus, when the occupant's arm is in contact with the central chamber 21, the occupant's arm may move upward along an inner surface of the central chamber 21.

The third chamber wall 27 may partition the central chamber 21 from the upper chamber 23, such that the upper chamber 23 has an approximately '∩' shape when viewed from the side.

For this, the third chamber wall 27 may be inclined forward and downward at a portion in which the central chamber 21 and the upper chamber 23 are connected to each other.

The third chamber wall 27 may be provided as a non-inflating area that does not inflate during inflation and deployment of the airbag cushion 20 and may have an area larger than that of a space between the upper chamber 23 and the central chamber 21, allowing the upper chamber 23 to expand upward.

Thus, the third chamber wall 27 may remain partially folded during the initial deployment of the airbag cushion 20 and may deploy and expand upward as the upper chamber 23 moves upward due to the movement of the occupant's arm.

Here, the third chamber wall 27 may define the maximum height to which the upper chamber 23 moves and expands upward.

Like this, according to the present invention, the upper chamber and a rear portion of the central chamber may communicate with each other to transfer the gas, and the upper chamber may expand upward in response to the upward movement of the occupant's arm, so as to correspond the head of the occupant in the rest mode posture, thereby safely protecting the occupant's head.

Meanwhile, the airbag cushion 20 may be provided with an external vent (not shown) that discharges the gas inside the airbag cushion 20 to the outside.

For example, the external vent may be disposed on a front end of the central portion of the central chamber 21.

Thus, after the airbag cushion 20 is inflated and deployed upon the side collision of the vehicle, the central chamber 21 may gradually release the gas therein through the external vent over time, allowing a deployment pressure to be regulated.

Hereinafter, an operation method of the side airbag device of the vehicle according to a preferred embodiment of present the disclosure will be described in detail.

In the event of the side collision of the vehicle, there is a time difference in the contact between the airbag cushion 20 and the occupant's upper body, depending on a portion of the upper body.

That is, while the occupant's pelvis, abdomen, and chest portions move toward a collision side immediately upon impact, the head portion of the occupant rotates around a neck, thus, a relative time delay occurs before colliding with a vehicle member.

Therefore, according to the present invention, in the early stages of the side collision of the vehicle, as shown in FIGS. 3 and 4, the gas generated from the inflater 30 may be sequentially supplied to the lower and upper chambers 22 and 23 through the central chamber 21 to inflate and deploy the airbag.

Here, as the upper chamber 23 is inflated and deployed while maintaining a front end thereof is almost in contact with an upper end of the central chamber 21, the airbag may avoid interference with the curtain airbag 40 on a side of a vehicle's roof rail.

Like this, according to the present invention, in the early stage of airbag cushion deployment, the height to which the airbag cushion inflates upward may be limited to avoid interference with the curtain airbag.

Accordingly, according to the present invention, injury to occupant's chest caused by excessive pressure generated in the side airbag while the upper portion of the side airbag is interfering with a lower portion of the curtain airbag, may be prevented.

Meanwhile, in the event of the side collision of the vehicle, the occupant may move toward the collision side while being in contact with the airbag cushion 20. Here, the occupant's arm may move upward along the inner surface of the central chamber 21 of the airbag cushion 20.

When the occupant's arm, which moves upward, moves to the height of the third chamber wall 27 between the central chamber 21 and the upper chamber 23 of the airbag cushion 20, the upper chamber 23 rotates upward around the rear portion connected to the central chamber 21, as shown in FIGS. 5 and 6.

Thus, the upper chamber 23 may move upward higher than a height shown in FIGS. 3 and 4 to expand.

Like this, according to the present invention, in the event of the side collision of the vehicle, the upper chamber of the airbag cushion may expand upward due to the movement of the occupant's arm.

Accordingly, when the occupant rotates the backrest backward to take a rest in the rest mode, deviating from the normal seating position, the side airbag according to the present invention may still sufficiently protect the occupant's head, which is moved backward and upward from the backrest.

According to experimental results, it was confirmed that the side of the occupant's whole upper body including the head may be effectively protected, even when the occupant is tilted the backrest of the seat backward by more than 40 degrees.

Additionally, according to the present invention, the plurality of chamber walls which partition the one airbag cushion into the plurality of chambers may be provided to create the non-inflating area, and the gas provided to the central chamber of the airbag cushion may be supplied to the upper chamber to protect the occupant's head, to reduce the amount of gas required for airbag cushion deployment, thereby minimizing the capacity of the inflater.

Although the invention made by the inventors of the present application has been specifically described according to the above embodiments, the present invention is not limited to the above embodiments, and may be modified variously within a scope of the technical essence of the disclosure.

INDUSTRIAL APPLICABILITY

The present invention may be applied to a vehicle's side airbag device technology, which expands the upper chamber of the side airbag upward upon contact with the occupant's arm, thereby safely protecting the occupant's head.

The invention claimed is:

1. A side airbag apparatus for a vehicle, the side airbag apparatus comprising:

an airbag cushion that is accommodated in a backrest of a seat and configured to expand and deploy corresponding to a side of an upper body of an occupant upon side collision of the vehicle; and an inflator that generates gas in response to an impact detection signal to supply the gas to the airbag cushion upon side collision of the vehicle, wherein the airbag cushion includes:

a central chamber configured to correspond to a chest portion and an upper abdomen portion of the occupant;

a lower chamber configured to correspond to a pelvis portion and a lower abdomen portion of the occupant;

an upper chamber configured to correspond to a head portion of the occupant; and a chamber wall, which is not expanded at an initial stage of deployment of the airbag cushion, is formed between the central chamber and the upper chamber, and the chamber wall is configured to expand and move upward by making contact with an arm portion of the occupant, thereby increasing an expansion height of the airbag cushion that expands and deploys upward; the chamber wall defines the expansion height of the airbag cushion.

2. The side airbag apparatus of claim 1, wherein a rear portion of the upper chamber is connected to the central chamber to receive the gas supplied from the inflator, and the upper chamber expands while rotating upward about the rear portion connected to the central chamber when configured to make contact with the arm portion of the occupant.

3. The side airbag apparatus of claim 2, wherein the central chamber expands and deploys such that a central portion and a front end portion of the central chamber have a thickness larger than a thickness of a rear end portion of the central chamber.

4. The side airbag apparatus of claim 2, wherein the upper chamber expands and deploys such that a width of the central chamber is gradually reduced in a lateral direction from a center portion toward an upper portion thereof configured to move the arm portion upward when the central chamber makes contact with the arm portion of the occupant.

5. The side airbag apparatus of claim 1, wherein the central chamber expands and deploys such that a central portion and a front end portion of the central chamber have a thickness larger than a thickness of a rear end portion of the central chamber.

6. The side airbag apparatus of claim 1, wherein the upper chamber expands and deploys such that a width of the central chamber is gradually reduced in a lateral direction from a center portion toward an upper portion thereof configured to move the arm portion upward when the central chamber makes contact with the arm portion of the occupant.

* * * * *